(12) United States Patent
Innes et al.

(10) Patent No.: US 9,013,123 B2
(45) Date of Patent: Apr. 21, 2015

(54) SELF PROTECTED DYNAMIC BRAKING

(71) Applicant: Rockwell Automation Technologies, Inc., Mayfield Heights, OH (US)

(72) Inventors: Mark Innes, Asheville, NC (US); Gregory A Helton, Hendersonville, NC (US); Roger Alan Plemmons, Asheville, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 179 days.

(21) Appl. No.: 13/867,849

(22) Filed: Apr. 22, 2013

(65) Prior Publication Data

US 2014/0313621 A1    Oct. 23, 2014

(51) Int. Cl.
*H02P 3/00* (2006.01)
*H02H 7/08* (2006.01)
*H02P 3/12* (2006.01)
*H02P 3/22* (2006.01)

(52) U.S. Cl.
CPC .............. *H02H 7/0833* (2013.01); *H02P 3/12* (2013.01); *H02P 3/22* (2013.01)

(58) Field of Classification Search
CPC .............. B60L 7/02; H02P 3/12; H02P 3/22
USPC .................. 318/63, 87, 88, 759, 375, 612
See application file for complete search history.

(56) References Cited

U.S. PATENT DOCUMENTS

| | | | | |
|---|---|---|---|---|
| 5,517,093 A | * | 5/1996 | Augustyniak et al. | 318/63 |
| 2004/0245783 A1 | * | 12/2004 | Gilbreth et al. | 290/52 |
| 2005/0235865 A1 | * | 10/2005 | Kumar | 105/61 |
| 2007/0013232 A1 | * | 1/2007 | McNally et al. | 307/10.1 |
| 2009/0174349 A1 | * | 7/2009 | Iwashita et al. | 318/400.06 |

* cited by examiner

*Primary Examiner* — Rina Duda
*Assistant Examiner* — Bickey Dhakal
(74) *Attorney, Agent, or Firm* — Kunzler Law Group

(57) ABSTRACT

An apparatus for dynamic braking is disclosed. The apparatus includes a first switch connected to a first connection of a dynamic braking resistor and to a first power bus of a motor controller. The apparatus includes a second switch connected to a second connection of the dynamic braking resistor and to a second power bus of the motor controller. The motor controller provides power to and controls a motor. The apparatus includes a switch control module that controls the first and second switches to connect the dynamic braking resistor to the first and second power buses. The switch control module controls the first and second switches in response to a signal from the motor controller.

19 Claims, 9 Drawing Sheets

| Test | \multicolumn{5}{c}{Control Variables} | \multicolumn{9}{c}{Faults} | Result | Step | Diagnostic |

| Test | S1 | S2 | TFB | BFB | I | TGF | RSC | BGF | RO | S1 | S2 | TFB | BFB | I | Result | Step | Diagnostic |
|---|---|---|---|---|---|---|---|---|---|---|---|---|---|---|---|---|---|
| 1 | 1 | 0 | 1 | 1 | 0 | - | - | - | - | - | - | - | - | - | OK | 16 | |
| 2 | 1 | 0 | 1 | 1 | 0 | GF | - | - | - | - | - | - | - | - | Fault | Done | Top tells bottom GF |
| 3 | 1 | 0 | 1 | 1 | 0 | - | SC | - | - | - | - | - | - | - | Not Detected | 16 | |
| 4 | 1 | 0 | 1 | 0.5 | 0 | - | - | - | - | - | - | - | - | - | Fault | Done | If S2 off, bottom checks a/d on Voltage |
| 5 | 1 | 0 | 1 | 0 | 0 | - | - | - | Op | - | - | - | - | - | Fault | 21 | Open load or bottom FB failure |
| 6 | 1 | 0 | 1 | 1 | 0 | - | - | GF | - | - | - | - | - | - | Not Detected | 16 | |
| 7 | 1 | 0 | 0 | 1 | 0 | - | - | - | - | SC | - | - | - | - | Fault | Done | S1 open |
| 8 | 1 | 0 | 1 | 0 | 0 | - | - | - | - | Op | SC | - | - | - | Fault | Done | S2 shorted |
| 9 | 1 | 0 | 1 | 1 | 0 | - | - | - | - | - | Op | - | - | - | Not Detected | 16 | |
| 10 | 1 | 0 | 1 | 1 | 0 | - | - | - | - | - | - | High | - | - | Not Detected | 16 | |
| 11 | 1 | 0 | 0 | 1 | 0 | - | - | - | - | - | - | Low | - | - | Fault | Done | |
| 12 | 1 | 0 | 1 | 1 | 0 | - | - | - | - | - | - | - | High | - | Not Detected | 16 | |
| 13 | 1 | 0 | 1 | 0 | 0 | - | - | - | - | - | - | - | Low | - | Fault | 21 | Open load or BFB |
| 14 | 1 | 0 | 1 | 1 | 1 | - | - | - | - | - | - | - | - | High | Fault | Done | Damaged current hardware |
| 15 | 1 | 0 | 1 | 1 | 0 | - | - | - | - | - | - | - | - | Low | Not Detected | 16 | |
| 16 | 1 | 1 | 1 | 1 | 1 | - | - | - | - | - | - | - | - | - | OK | Run | |
| 17 | 1 | 1 | 1 | 0 | 1 | - | SC | - | - | - | - | - | - | - | Fault | Done | Load shorted |
| 18 | 1 | 1 | 1 | 1 | 1 | - | - | - | - | SC | - | - | - | - | Not Detected | Run | Not detectable while running |
| 19 | 1 | 0 | 1 | 1 | 0 | - | - | - | - | - | Op | - | - | - | Fault | Done | S2 open |
| 20 | 1 | 1 | 1 | 1 | 1 | - | - | - | - | - | - | High | - | - | Not Detected | Run | Not detectable while running |
| 21 | 1 | 0 | 1 | 0 | 0 | - | - | - | Op | - | - | - | - | - | Fault | Done | Load |
| 22 | 1 | 1 | 1 | 0 | 1 | - | - | - | - | - | - | - | Low | - | Fault | Done | Top feedback bad |

FIG. 8

| | Control Variables | | | | | Faults | | | | | | | | | Result | Step | Diagnostic |
|---|---|---|---|---|---|---|---|---|---|---|---|---|---|---|---|---|---|
| Test | S1 | S2 | TFB | BFB | I | TGF | RSC | BGF | RO | S1 | S2 | TFB | BFB | I | | | |
| 1 | 0 | 0 | 0 | 0 | 0 | - | - | - | - | - | - | - | - | - | OK | 16 | |
| 2 | 0 | 0 | 0 | 0 | 0 | GF | - | - | - | - | - | - | - | - | Fault | 32 | S1 short or GF |
| 3 | 0 | 0 | 0 | 0 | 0 | - | SC | - | - | - | - | - | - | - | Not Detected | 16 | |
| 4 | 0 | 0 | 0 | 0 | 0 | - | - | GF | - | - | - | - | - | - | Fault | 32 | S1 short or GF |
| 5 | 0 | 0 | 0 | 0 | 0 | - | - | - | Op | - | - | - | - | - | Not Detected | 16 | |
| 6 | 0 | 0 | 0 | 0 | 0 | - | - | - | - | SC | - | - | - | - | Fault | 32 | S1 short or GF |
| 7 | 0 | 0 | 0 | 0 | 0 | - | - | - | - | Op | - | - | - | - | Not Detected | 16 | |
| 8 | 0 | 0 | 0 | 0 | 0 | - | - | - | - | - | SC | - | - | - | Not Detected | 16 | |
| 9 | 0 | 0 | 0 | 0 | 0 | - | - | - | - | - | Op | - | - | - | Not Detected | 16 | |
| 10 | 0 | 0 | 0 | 0 | 0 | - | - | - | - | - | - | High | - | - | Fault | Done | Damaged top feedback |
| 11 | 0 | 0 | 0 | 0 | 0 | - | - | - | - | - | - | Low | - | - | Not Detected | 16 | |
| 12 | 0 | 0 | 0 | 0 | 0 | - | - | - | - | - | - | - | High | - | Fault | Done | Damaged bottom feedback |
| 13 | 0 | 0 | 0 | 0 | 0 | - | - | - | - | - | - | - | Low | - | Not Detected | 16 | |
| 14 | 0 | 0 | 0 | 0 | 1 | - | - | - | - | - | - | - | - | High | Fault | Done | Damaged current hardware |
| 15 | 0 | 0 | 0 | 0 | 0 | - | - | - | - | - | - | - | - | Low | Not Detected | 16 | |
| 16 | 1 | 0 | 1 | 0 | 1 | - | - | - | - | - | - | - | - | - | OK | 26 | |
| 17 | 1 | 0 | 1 | 0 | 1 | - | SC | - | - | - | - | - | - | - | Not Detected | 26 | |
| 18 | 1 | 0 | 1 | 0 | 1 | - | - | - | Op | - | - | - | - | - | Fault | 30 | Open load or bad bottom feedback |
| 19 | 1 | 0 | 1 | 0 | 0 | - | - | - | - | Op | - | - | - | - | Fault | Done | S1 open |
| 20 | 1 | 0 | 1 | 0 | 1 | - | - | - | - | Op | - | - | - | - | Fault pwr low | Done | Top sends fault code |
| 21 | 1 | 0 | 1 | 0 | 1 | - | - | - | - | - | SC | - | - | - | Fault | Done | S2 shorted |
| 22 | 1 | 0 | 1 | 0 | 1 | - | - | - | - | - | Op | - | - | - | Not Detected | 26 | |
| 23 | 1 | 0 | 0 | 0 | 1 | - | - | - | - | - | - | Low | - | - | Fault | Done | Top feedback bad |
| 24 | 1 | 0 | 1 | 1 | 1 | - | - | - | - | - | - | - | Low | - | Fault | Done | Bottom feedback bad |
| 25 | 1 | 0 | 1 | 0 | 0 | - | - | - | - | - | - | - | - | Low | Not Detected | 26 | |
| 26 | 1 | 1 | 1 | 0 | 1 | - | - | - | - | - | - | - | - | - | OK | Run | |
| 27 | 1 | 1 | 1 | 0 | 1 | - | SC | - | - | - | - | - | - | - | Fault | Done | Load short |
| 28 | 1 | 1 | 1 | 0 | 1 | - | - | - | - | - | Op | - | - | - | Fault | Done | S2 open |
| 29 | 1 | 1 | 1 | 0 | 1 | - | - | - | - | - | - | - | - | Low | Fault | Done | Current hardware bad |
| 30 | 1 | 1 | 1 | 0 | 1 | - | - | - | - | - | - | - | Low | - | Fault | Done | Bad bottom sensor |
| 31 | 1 | 1 | 1 | 0 | 1 | - | - | - | Op | - | - | - | - | - | Fault | Done | Open load |
| 32 | 1 | 0 | 1 | 1 | 0 | GF | - | - | - | - | - | - | - | - | Fault top GF | Done | Top sends fault |
| 33 | 0 | 1 | 1 | 1 | 1 | - | - | GF | - | - | - | - | - | - | Fault | Done | Ground fault bottom of resistor (short) |
| 34 | 0 | 0 | 1 | 0 | - | - | - | - | - | SC | - | - | - | - | Fault S1 short | Done | Voltage full = S1 short |

FIG. 9

SELF PROTECTED DYNAMIC BRAKING

FIELD

The subject matter disclosed herein relates to dynamic braking and more particularly relates to protection of circuits during dynamic braking.

BACKGROUND

Description of the Related Art

Certain types of rotating electric machines can be either motors or generators. Often this rotating electric machine is called a motor when its primary purpose is to function as a motor, even though at times it may function as a generator. When power is removed from a motor that is capable of being a generator, the motor typically continues to spin causing the motor to switch to a generator mode where the motor can generate power. The motor may be connected to a rotating load that may have inertia and may continue to spin when power is removed from the motor. The motor and load have an amount of potential energy that causes the motor and load to continue to spin until friction and other forces cause the motor to slow and stop.

One way to slow a motor is dynamic braking. Dynamic braking is a method of slowing a motor by attaching an electrical load to the motor so that the motor generates power that is dissipated in the electrical load. When the electrical load is a power system so that the power generated by the motor during dynamic braking is returned to the power system, the dynamic braking is called regenerative braking. When the electrical load is a resistive load so that the power generated by the motor during dynamic braking is dissipated in the resistive load, the dynamic braking is called rheostatic braking. The resistive load may be a dynamic braking resistor.

During rheostatic braking, a fault or failure may damage a motor controller that controls the motor, such as a variable frequency drive, and may cause an overcurrent protection device to open. In a situation where the overcurrent device feeds multiple motors, opening the overcurrent protection device disconnects the multiple motors, which is often an undesirable situation. For example, shutting the multiple motors may shut down an assembly line, which may be expensive due to production delays.

BRIEF SUMMARY

An apparatus for dynamic braking is disclosed. A system and method also perform the functions of the apparatus. The apparatus includes a first switch connected to a first connection of a dynamic braking resistor and to a first power bus of a motor controller. The apparatus includes a second switch connected to a second connection of the dynamic braking resistor and to a second power bus of the motor controller. The motor controller provides power to and controls a motor. The apparatus includes a switch control module that controls the first and second switches to connect the dynamic braking resistor to the first and second power buses. The switch control module controls the first and second switches in response to a signal from the motor controller.

In one embodiment, the switch control module also includes a fault detection module that signals a fault condition in response to detecting a fault condition associated with the dynamic braking resistor, the first switch, the second switch, and/or one or more detectors associated with the first and second switches and dynamic braking resistor. In another embodiment, the switch control module opens the first switch and/or the second switch in response to the fault detection module signaling the fault condition.

In another embodiment, the motor controller is a first motor controller and power to the first motor controller is controlled by a contactor where the contactor controls power to two or more motor controllers including the first motor controller. In the embodiment, the fault module sends a stop signal to the first motor controller in response to detecting the fault condition. In a further embodiment, the contactor maintains power to the two or more motor controllers while the first motor controller stops power to the motor in response to the stop signal. In one embodiment, the fault detection module detects the fault condition by determining if a current through the first switch is an unexpected current, a current through the second switch is an unexpected current, a voltage at the first connection is an unexpected voltage, and/or a voltage as the second connection is an unexpected voltage. In a further embodiment, the apparatus includes a thermal model module that models heat of a resistive element of the dynamic braking resistor, heat transfer to a case of the dynamic braking resistor, and/or heat transferred from the dynamic braking resistor to an environment surrounding the dynamic braking resistor. The fault detection module detects a fault condition when heat calculated by the thermal model module exceeds one or more heat limits.

In one embodiment, the one or more detectors include one or more of a first current sensor that senses current through the first switch, a first voltage sense connection at the first connection to the dynamic braking resistor, a second current sensor that senses current through the second switch, and a second voltage sense connection at the second connection to the dynamic braking resistor. In a further embodiment, the first current sensor and/or the second current sensor include a resistor and the fault detection module uses voltage across the resistor to determine current.

In another embodiment, the fault detection module also includes a start sequence module that applies a startup testing sequence, during a startup sequence, to determine a fault condition for the apparatus. In another embodiment, the startup testing sequence includes closing and opening the first switch and the second switch in a sequence to detect a ground fault, a shorted dynamic braking resistor, an open dynamic braking resistor, the first switch failed short, the second switch failed short, a failed current sensor, and/or a failed voltage sense connection. In another embodiment, the startup sequence includes a startup sequence of the motor controller and/or a startup sequence of the apparatus.

In one embodiment, the fault detection module includes a running sequence module that applies a running testing sequence, while the motor controller is controlling the motor, to determine a fault condition for the apparatus. In a further embodiment, the running testing sequence includes closing and opening the first switch and/or the second switch in a sequence to detect a ground fault, a shorted dynamic braking resistor, an open dynamic braking resistor, the first switch failed short, the second switch failed short, a failed current sensor, and/or a failed voltage sense connection.

In one embodiment, the first switch and/or the second switch include an insulated-gate bipolar transistor ("IGBT"). In another embodiment, the dynamic braking resistor is a resistor without a thermal switch that opens in response to a temperature of the resistor reaching a threshold.

A method for dynamic braking includes determining that a fault condition exists in a dynamic braking apparatus. The dynamic braking apparatus includes a dynamic braking resistor, a first switch, a second switch, a first current sensor that senses current in the first switch, a second current sensor that senses current in the second switch, a first voltage sense connection that senses voltage associated with a first connection, and a second voltage sense connection that senses voltage associated with a second connection. The first switch connects the dynamic braking resistor to a first power bus of a motor controller via the first connection, and the second switch connects the dynamic braking resistor to a second power bus of the motor controller via the second connection. The motor controller controls a motor. The method includes opening the first switch and/or the second switch in response to determining that the fault condition exists in the dynamic braking circuit.

In one embodiment, determining that the fault condition exists includes determining that an unexpected value is returned by the first current sensor, the second current sensor, the first voltage sensor, and/or the second voltage sensor. In another embodiment, determining that the fault condition exists includes applying a startup test sequence during a startup condition. The startup test sequence includes closing and opening the first switch and the second switch in a sequence to detect the fault condition. The fault condition, in one embodiment, includes a ground fault, a shorted dynamic braking resistor, an open dynamic braking resistor, the first switch failed short, the second switch failed short, a failed current sensor, and/or a failed voltage sense connection.

In another embodiment, determining that the fault condition exists includes applying a running test sequence while the motor controller controls the motor. The running test sequence includes closing and opening the first switch and/or the second switch in a sequence to detect the fault condition. The fault condition includes a ground fault, a shorted dynamic braking resistor, an open dynamic braking resistor, the first switch failed short, the second switch failed short, a failed current sensor, and/or a failed voltage sense connection.

A system for dynamic braking includes a motor controller that controls a motor, a dynamic braking resistor, and a first switch connected to the dynamic braking resistor at a first connection point and to a first power bus of the motor controller. The first switch connects the dynamic braking resistor to the first power bus. The system includes a second switch connected to the dynamic braking resistor at a second connection point and to a second power bus of the motor controller. The second switch connects the dynamic braking resistor to the second power bus. The system includes a switch control module that controls the first and second switches to connect the dynamic braking resistor to the first and second power buses. The switch control module controls the switches in response to a signal from the motor controller.

In one embodiment, the switch control module includes a fault detection module that opens at least one of the first and second switches in response to detecting a fault condition associated with the dynamic braking resistor, the first switch, the second switch, and/or one or more detectors associated with the first and second switches.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a running testing sequence for dynamic braking testing while a motor is running; and FIG. 9 is a startup testing sequence for dynamic braking prior to startup of a motor.

DETAILED DESCRIPTION

Figure 1:
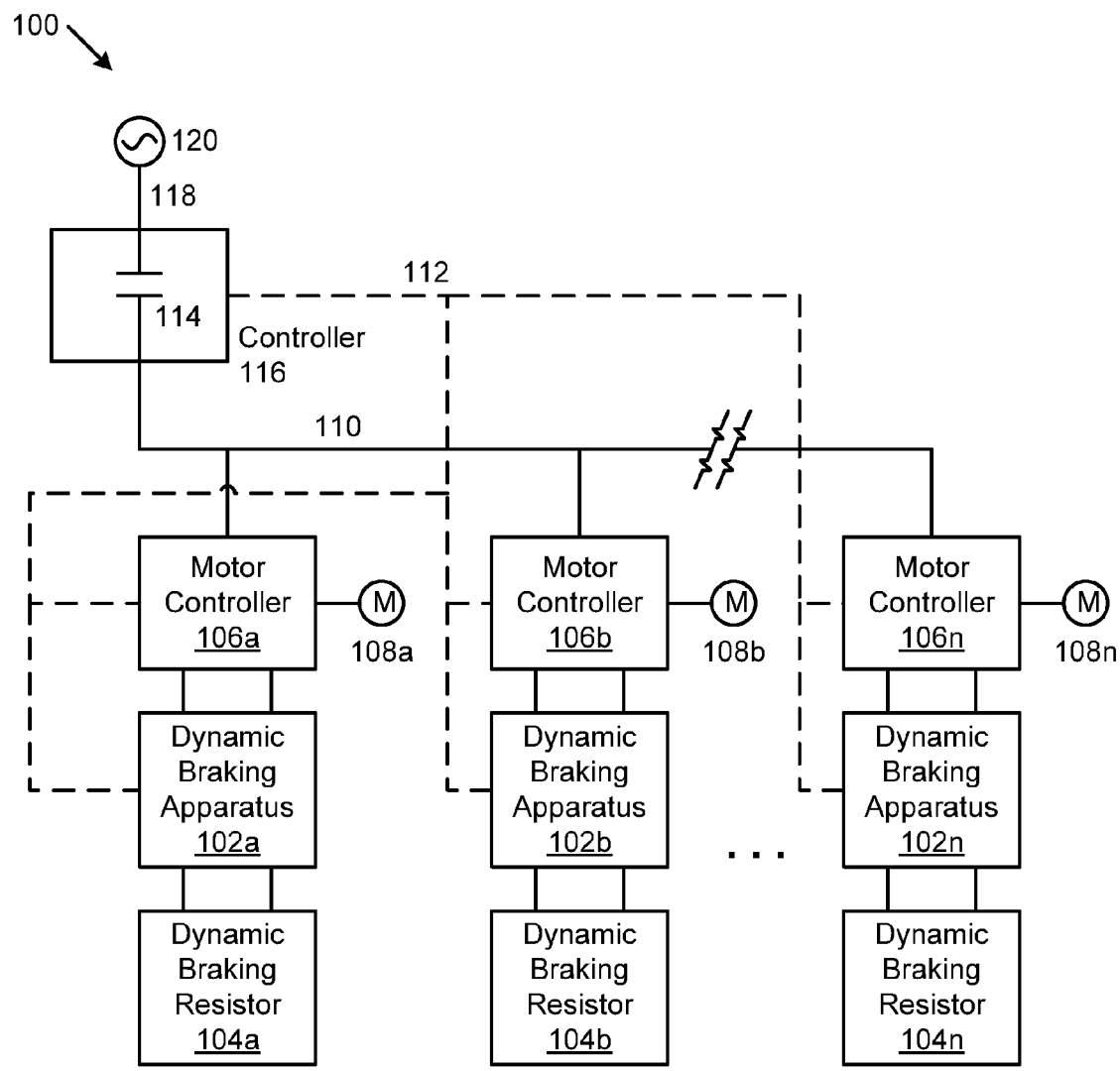
FIG. 1 is a schematic block diagram illustrating one embodiment of a system for dynamic braking.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as an apparatus, system, method, and/or computer program product. Accordingly, aspects of the present invention may take the form of an entirely hardware embodiment or a software embodiment (including firmware, resident software, micro-code, etc.) with some hardware that may all generally be referred to herein as a "circuit," "module," "apparatus" or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer program product may be shared, simultaneously serving multiple locations in a flexible, automated fashion.

Furthermore, the described features, structures, or characteristics of the embodiments may be combined in any suitable manner. In the following description, numerous specific details are provided, such as examples of programming, software modules, user selections, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by hardware and/or program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for dynamic braking. The system 100 includes dynamic braking apparatuses 102a-102n (collectively "102"), dynamic braking resistors 104a-104n (collectively "104"), motor controllers 106a-106n (collectively "106"), motors 108a-108n (collectively "108"), a power bus 110, a communication bus 112, a contactor 114 in a controller 116, branch circuit conductors 118, and a power source 120, which are described below. (Note that in the description below, it is understood that identifying a dynamic braking apparatus as 102 may refer to a single dynamic braking apparatus or to multiple dynamic braking apparatuses. The same may be true when referring to a dynamic braking resistor 104, a motor controller 106, or a motor 108.)

The system 100 includes a dynamic braking apparatus 102 controlling connection of a dynamic braking resistor 104 to a motor controller 106 for dissipating electrical energy generated by a motor 108. The dynamic braking apparatus 102 includes functionality not available in the prior art. The dynamic braking apparatus 102 is described in more detail below.

The system 100 includes a dynamic braking resistor 104. Typically, a dynamic braking resistor 104 is connected to one or more buses in a motor controller 106 to assist a motor 108 in dynamic braking and to dissipate power. In one embodiment, the dynamic braking resistor 104 includes two or more resistors. Typically, a dynamic braking resistor 104 is sized to dissipate power for a particular motor 108 or is sized based on a maximum load of the motor controller 106. Sizing a dynamic braking resistor 104, in one embodiment, includes choosing a power rating for the dynamic braking resistor 104 suitable to handle dissipation of power from the motor 108. In one embodiment, the motor controller 106 may be rated for a group motor installation and may control multiple motors 108 and the dynamic braking resistor 104 may be sized to dissipate power for the group of motors controlled by the motor controller 106 in the group motor installation. The dynamic braking resistor 104 may include a heat sink, a fan, or the like to dissipate power.

In one embodiment, the dynamic braking resistor 104 does not include a temperature switch. For example, a typical prior art dynamic braking resistor may include a temperature switch that opens when the dynamic braking resistor reaches a certain temperature limit. Opening of the temperature switch may open an overcurrent protection device, contactor, etc. in a branch circuit feeding the multiple motors 108a-108n, which may be undesirable. As will be explained below, the dynamic braking resistor 104 may not include a temperature switch and the dynamic braking apparatus 102 may act instead to remedy an over-temperature situation or other fault condition for the dynamic braking resistor 104 and dynamic braking apparatus 102. A dynamic braking resistor 104 without a temperature switch may be less expensive than a dynamic braking resistor 104 with a temperature switch. In another embodiment, the dynamic braking resistor 104 may include a temperature switch that is not connected or that is connected and used as backup protection for the dynamic braking apparatus 102.

The system 100 includes one or more motor controllers 106. In one embodiment, a motor controller 106 controls one motor 108, as depicted in FIG. 1. In another embodiment, a motor controller 106 controls multiple motors in a group motor installation. In one embodiment, the motor controller 106 includes a contactor that connects power to one or more motors 108. For example, the motor controller 106 may include a relay that is commanded open and closed to start and stop the motor(s) 108. The dynamic braking apparatus 102 may connect the dynamic braking resistor 104 when the relay is opened such that the dynamic braking resistor 104 is an electric load to the motor 108 in a dynamic braking situation. In another embodiment, the motor controller 106 includes a soft-start.

In another embodiment, the motor controller 106 is a variable speed drive, such as a variable frequency drive ("VFD"). For example, the VFD may rectify alternating current ("AC") voltage from a power source 120 and may include two or more direct current ("DC") busses. The dynamic braking apparatus 102 may connect the dynamic braking resistor 104 to the DC busses. In another embodiment, the system 100 includes multiple types of motor controllers 106. One of skill in the art will recognize other motor controllers 106 that may benefit from the various embodiments of dynamic braking apparatuses 102 described herein.

The system 100 includes at least one motor (e.g. 108a), but may also include multiple motors 108 as depicted in FIG. 1. In one embodiment, one or more of the motors 108 are three-phase motors, such as squirrel cage motors. In another embodiment, one or more of the motors 108 are single-phase motors. In another embodiment, one or more of the motors 108 are DC motors. In various embodiments, one or more of the motors 108 may be stepper motors, linear motors, or other type of motor known to those of skill in the art. The motors 108 are of a type that can be configured with dynamic braking. The motor controllers 106 are selected based on motor type and size and for a particular function of the motor 108 (i.e. constant speed, variable speed, variable load, etc.).

The system 100 includes a power bus 110 that feeds one or more motor controllers 106 and associated motors 108. For example, the power bus 110 may be part of a distributed system where a single set of branch circuit conductors 118 feeds multiple motor controllers 106 and/or multiple motors 108. A distributed system may include a motor controller 106 located close to a motor 108 controlled by the motor controller 106, rather than grouped in a motor control center ("MCC"). The power bus 110 may include insulated conductors, bus bars, etc. For example, in a distributed system the power bus 110 may be conductors in conduit feeding the motor controllers 106. The power bus 110, in various embodiments, may transmit three-phase power, single-phase power, or DC power. In one embodiment, the power bus 110 feeds a single motor controller 106. One of skill in the art will recognize other configurations of a power bus 110.

The system 100, in one embodiment, includes a communication bus 112. The communication bus 112 may use a communication protocol typical of industrial applications. For example, the communication bus 112 may be a serial peripheral interface ("SPI"), a serial communications interface ("SCI"), supervisory control and data acquisition ("SCADA"), Modbus, Modbus X, Distributed Network Protocol ("DNP"), BACnet, DF-1, RS-232, or the like. In another embodiment, the communication bus 112 may include wireless or wired communications. For example, the communication bus 112 may include Wi-Fi, radio frequency, cellular, infrared, or other wireless protocol. In another embodiment, the communication bus 112 may include both wired and wireless communications.

The communication bus 112 may connect a controller 116 with the motor controllers 106. For example, an automated assembly line may include a controller 116 that communicates with the motor controllers 106 via the communication bus 112 to start, stop, adjust speed, sequence, etc. the motors 108. The controller 116 may interact with a control module in a motor controller 106 to relay commands to the motor controller 106 to control the motors 108. In the prior art, temperature switches may interact with a control module and the control module may send a signal to open a contactor 114 in an over-temperature condition. As will be explained below, the dynamic braking apparatus 102 may interact directly with the motor controller 106.

The system 100, in one embodiment, includes a contactor 114. The contactor 114 may be a relay, an overcurrent protection device, or the like. In one embodiment, the contactor 114 controls power to the power bus 110 based on control signals, such as from the controller 116. In another embodiment, the contactor 114 includes an overcurrent protection function, and may open in response to an overcurrent or fault condition. In another embodiment, another device between the power source 120 and the power bus 110 functions as an overcurrent protection device. In one embodiment, the contactor 114 includes additional functionality, such as opening based on over-temperature, etc. In another embodiment, the contactor 114 is a relay and overcurrent protection, over-temperature protection, motor control commands, etc. are handled within another device, such as the controller 116. In one embodiment, the contactor 114 is within the controller 116. In another embodiment, the contactor 114 is apart from the controller 116. As will be explained below, the dynamic braking apparatus 102 may detect problems associated with dynamic braking and may take action to isolate the problem, to shut down the motor 108 with a dynamic braking problem, etc. without opening the contactor 114. One of skill in the art will recognize other ways to configure a contactor 114 controlling power to multiple motors 108.

The system 100 includes a controller 116 that controls one or more motors 108. In one embodiment, the controller is a programmable logic controller ("PLC"). In another embodiment, the controller 116 is a computer. In another embodiment, the controller 116 is a control module. For example, the controller 116 may be one element of a control system to control a process, such as an assembly line, a printing press, a production line, etc. In another embodiment, the controller 116 is a computing device controlling the process. In another embodiment, the controller 116 is an element, such as a control module, controlled by a PLC or other component in a control system and a higher level device controls the PLC. In another embodiment, the controller 116 includes one or more protective functions, such as overcurrent protection, over-temperature protection, protection against motor torque exceeding a limit, a safety shutdown function, etc. One of skill in the art will recognize other types and functions of a controller 116.

The system 100 includes branch circuit conductors 118 from a power source 120. The power source 120 may be a utility power system, a plant power system, a generator, a battery, etc. The power source 120 may be a three-phase AC source, a single-phase AC source, a DC source, etc. The power source 120 may a branch circuit panel, a distribution panel, switchgear, a motor control center, etc. The branch circuit conductors 118 are typically sized based on a maximum load expected from the motors 108 and may be sized based on overcurrent protection feeding the branch circuit conductors 118. For example, where the power source 120 is a distribution panel, the distribution panel may include a circuit breaker feeding the branch circuit conductors 118. The branch circuit conductors 118 may be in conduit. One of skill in the art will recognize other power sources 120 and branch circuit conductors 118.

Figure 2:
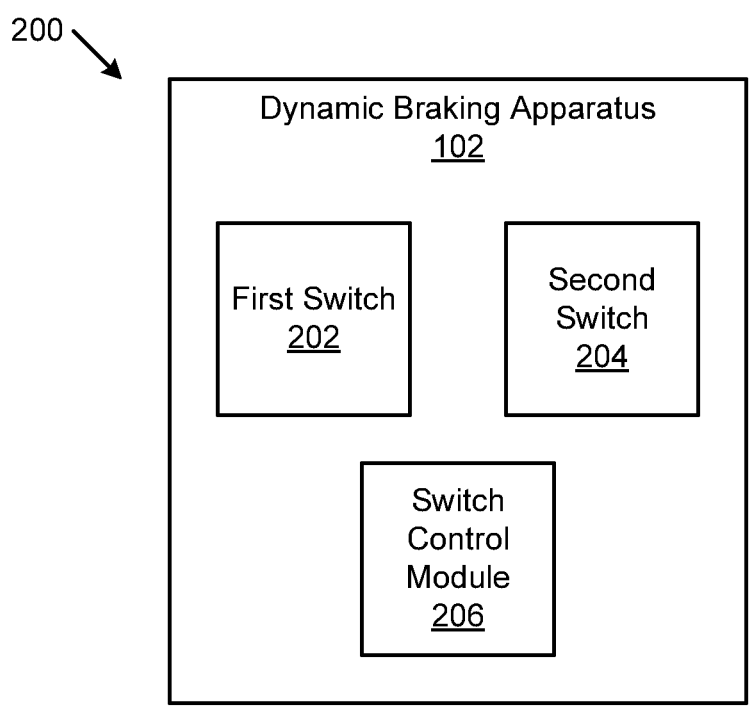
FIG. 2 is a schematic block diagram illustrating one embodiment of an apparatus for dynamic braking.

FIG. 2 is a schematic block diagram illustrating one embodiment of an apparatus 200 for dynamic braking. The apparatus 200 includes one embodiment of a dynamic braking apparatus 102 with a first switch 202, a second switch 204, and a switch control module 206, which are described below.

In one embodiment, the apparatus 200 includes a first switch 202 connected to a first connection of a dynamic braking resistor 104 and to a first power bus of a motor controller 106, and a second switch 204 connected to a second connection of the dynamic braking resistor 104 and to a second power bus of the motor controller 106. The motor controller 106 provides power to a motor 108 and controls the motor 108. The switch control module 206 controls the first and second switches 202, 204 to connect the dynamic braking resistor 104 to the first and second power buses. The switch control module 206 controls the first and second switches 202, 204 in response to a signal from the motor controller 106. The first and second switches 202, 204 may be of various types, such as a semiconductor switch, for example, an insulated-gate bipolar transistor ("IGBT"), a field-effect transistor ("FET"), etc. or a mechanical switch, such as a relay, or a combination of devices. One of skill in the art will recognize other suitable switches.

In one embodiment, the first bus and the second bus are busses within a VFD where the motor controller 106 is a VFD. For example, the VFD may include a rectifier section that rectifies an AC voltage. The rectifier section may be an H-bridge rectifier, full-bridge rectifier, etc. For instance, the motor controller 106 may be an AC-DC-AC converter with a DC section that includes a first bus and a second bus. In one embodiment, the first bus is a DC bus with a positive polarity and the second bus is a DC bus with a negative polarity. In another embodiment, the second bus is a neutral bus. In another embodiment, the apparatus 200 includes multiple dynamic braking resistors 104 and each dynamic braking resistor 104 is connected with a first and a second switch 202, 204 to a first bus and a second bus. In another embodiment, each first bus is a phase of a three-phase system and the second bus is a neutral connection, for example in a WYE-connected system of dynamic braking resistors 104. One of skill in the art will recognize other topologies where a first switch 202 and a second switch 204 may be connected to a dynamic braking resistor 104.

Prior art dynamic braking use a single switch to connect a dynamic braking resistor. Often the single switch is located between the dynamic braking resistor and the second bus. For a system with a single switch, some faults may not be cleared and may damage the motor controller or other components in the system. In addition, the fault may be cleared once overcurrent reaches a level to open an overcurrent protection device upstream from the motor controller that controls power to the dynamic braking resistor. The motor controller may be damaged and the overcurrent protection device may disconnect other motors.

The apparatus 200 includes a first switch 202 connected to one end of the dynamic braking resistor 104 and a second switch 204 connected to the other of the dynamic braking resistor 104, thus providing a more fault tolerant way to control power to the dynamic braking resistor 104. For example, a fault at the first connection can be cleared by the first switch 202. A fault at the second connection may be cleared by the second switch 204. In addition, the first and second switches 202, 204 may be used in a testing sequence to identify a fault condition during startup or during operation of the motor 108. Other failures and fault conditions may also be cleared and/or identified where the apparatus 200 includes a first and a second switch 202, 204.

Figure 3:
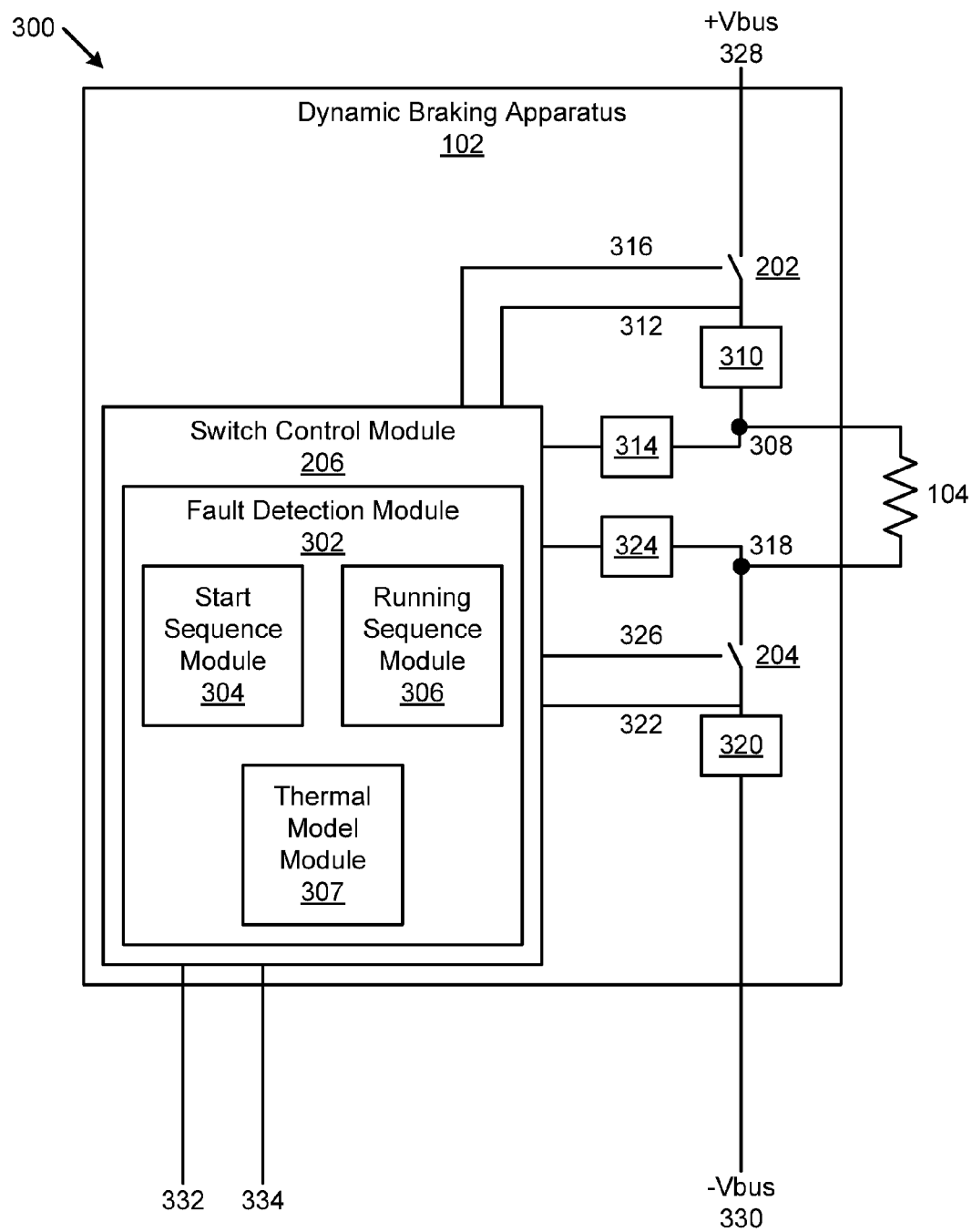
FIG. 3 is a schematic block diagram illustrating another embodiment of an apparatus for dynamic braking.

FIG. 3 is a schematic block diagram illustrating another embodiment of an apparatus 300 for dynamic braking. The apparatus 300 includes another embodiment, of a dynamic braking apparatus 102 with a first switch 202, a second switch 204, and a switch module 206, which are substantially similar to those discussed in relation to the apparatus 200 of FIG. 2. The apparatus 300 also includes a fault detection module 302, in the switch control module 206, with a start sequence module 304 and a running sequence module 306, a thermal model module 307, a first connection 308, a first current sensor 310, a first current sensor connection 312 a first voltage sense connection 314, a first switch control line 316, a second connection 318, a second current sensor 320, a second current sensor connection 322 a second voltage sense connection 324, a second switch control line 326, a first power bus 328, a second power bus 330, a dynamic braking command line 332, and one or more communication lines 334, which are described below. In one embodiment, the first connection 308, the second connection 318, the first power bus 328, and the second power bus 330 are substantially similar to those described above in relation to the apparatus 200 of FIG. 2.

In one embodiment, the apparatus 300 includes a first current sensor 310 that senses current through the first switch 202. In one example, the first current sensor 310 is a resistor and current is sensed by measuring voltage across the resistor. For example, the first current sensor connection 312 and the first voltage sense connection 314 can be used to measure voltage drop across the resistor. In another embodiment, the first current sensor 310 is a Hall-effect sensor. For example, where the first power bus 328 and the second power bus 330 are DC, a Hall-effect sensor may be used. In the embodiment, the first current sensor connection 312 may connect to the Hall-effect sensor. In another embodiment, the first current sensor 310 is a current transformer, for example, when the first and second power busses 328, 330 are AC. Other current sensing methods may also be used to detect current through the first switch 202. In addition, the first current sensor 310 may be located on either side of the first switch 202. One of skill in the art will recognize other ways to sense current through the first switch 202.

In another embodiment, the apparatus 300 includes a second current sensor 320 that senses current through the second switch 204. As depicted in FIG. 3, the second current sensor 320 is located between the second switch 204 and the second power bus 330. In the embodiment, where the second current sensor 320 is a resistor, the switch control module 206 may be referenced to the second power bus 330 and voltage across the resistor may be measured between the second current sensor connection 322 and the second power bus 330. In another embodiment, the second current sensor 320 is between the second connection 318 and the second switch 204 and the second current sensor connection 322 may be connected accordingly. As with the first current sensor 310, the second current sensor 320 may be a Hall-effect sensor, a current transformer, etc. and the second current sensor connection 322 may be connected as appropriate. The first and second current sensors 310, 320 are useful in determining fault conditions in the dynamic braking apparatus 102. For example, a higher than expected current may indicate a fault condition. In one embodiment, the first and second current sensor connections 312, 322 include an impedance (not shown) to limit current, buffer the current signal, etc.

In one embodiment, the apparatus 300 includes a first voltage sense connection 314 connected to the first connection 308. In another embodiment, the first voltage sense connection 314 is located at another point between the first switch 202 and the dynamic braking resistor 104. The first voltage sense connection 314 is configured to measure a voltage of the conductor between the first switch 202 and the dynamic braking resistor 104. The apparatus 300 also includes, in one embodiment, a second voltage sense connection 324 connected to the second connection 318. In another embodiment, the second voltage sense connection 324 is located at another point between the second switch 204 and the dynamic braking resistor 104. For example, where the second current sensor 320 is relocated between the second switch 204 and the dynamic braking resistor 104, the second voltage sense connection 324 may be between the second switch 204 and the second current sensor 320. The second voltage sense connection 324 is configured to measure a voltage of the conductor between the second switch 204 and the dynamic braking resistor 104.

The first and second voltage sense connections 314, 324 are useful in determining fault conditions in the dynamic braking apparatus 102. For example, the first voltage sense connection 314 may help detect a ground fault on the first switch 202 side of the dynamic braking resistor 104. In such a ground fault may cause voltage on the first voltage sense connection 314 to be lower than expected. In one embodiment, the first and second voltage sense connections 314, 324 include an impedance to limit current, etc. One of skill in the art will recognize other ways to implement the first and second voltage sense connections 314, 324.

The apparatus 300 includes a first switch control line 316 that controls the first switch 202 and a second switch control line 326 that controls the second switch 204, both by way of the switch control module 206. The first and second switch control lines 316, 326 typically control the first and second switches 202, 204 on and off. The switch control module 206 may include drivers and other circuits (not shown) to turn on and off the first and second switches 202, 204. The switch control module 206 may operate to control the first and second switches 202, 204 in response to commands from the motor controller 106, the fault detection module 302, the controller 116, and the like.

In one embodiment, the apparatus 300 includes a dynamic braking command line 332 that typically receives commands from the motor controller 106 to connect the dynamic braking resistor 104. In one embodiment, the motor controller 106 uses the dynamic braking command line 332 to signal closing or opening of one or both of the first and second switches 202, 204 to engage or disengage the dynamic braking function by connecting or disconnecting the dynamic braking resistor 104. For example, when the motor controller 106 receives a signal to stop the motor 108, or otherwise stops the motor 108 for other reasons, such as a fault in the motor controller 106 requiring the motor 108 to be stopped, the motor controller 106 may send a signal over the dynamic braking command line 332 to the switch control module 206 to close the first and second switches 202, 204. In one example, the switch control module 206 maintains one switch, such as the first switch 202 closed in normal operation and a signal from the motor controller 106 over the dynamic braking command line 332 closes the second switch 204. In one embodiment, the dynamic braking command line 332 is a one-way transmission line from the motor controller 106 to the switch control module 206. In another embodiment, the dynamic braking command line 332 is a duplex line with two-way communications.

In one embodiment, the apparatus 300 includes a communication line 334 that communicates with equipment beyond the motor controller 106, such as the controller 116, and may possibly communicate with the motor controller 106 as well. In one embodiment, the communication line 334 is part of the communication bus 112. In another embodiment, the fault detection module 302 uses the communication line 334 to communicate fault information, fault data, fault alerts, etc. In another embodiment, the communication line 334 is combined with the dynamic braking command line 332, for example, where a communication bus 112 serves the functions of the communication line 334 and the dynamic braking command line 332. One of skill in the art will recognize other configurations of communication lines 334 to allow communication between the dynamic braking apparatus 102, motor controller 106, controller 116, etc.

In one embodiment, the apparatus 300 includes a fault detection module 302, which may be part of the switch control module 206, that that signals a fault condition in response to detecting a fault condition associated with the dynamic braking resistor 104, the first switch 202, the second switch 204, and one or more detectors associated with the first and second switches 202, 204 and dynamic braking resistor 104. For example, the one or more detectors may include the first current sensor 310, the second current sensor 320, the first voltage sense connection 314, and/or the second voltage sense connection 324. In one embodiment, the fault detection module 302 signals the fault condition to the switch control module 206 and the switch control module 206 opens one or both of the first and second switches 202, 204. The switch control module 206 may open one or both of the first and second switches 202, 204 while the motor controller 106 is operating the motor 108.

In another embodiment, the fault detection module 302 signals the motor controller 106 of a fault condition and the motor controller 106 issues a stop command. For example, where the motor controller 106 is a manual starter or other type of starter that closes and opens contacts to start and stop the motor 108, the motor controller 106 may open contacts in the starter to stop the motor 108. In another embodiment where the motor controller 106 is a drive, such as a VFD, the motor controller 106 may command the drive to stop in response to a signal from the fault detection module 302, for example by stopping switching in the drive. Where the fault detection module 302 signals the motor controller 106 and the motor controller 106 stops the motor 108, a contactor 114 controlling power to other motors 108 may remain in a closed position so that other motors 108 powered by the contactor 114 are not affected by a fault detected by the fault detection module 302.

In another embodiment, the fault detection module 302 may determine that a fault exists prior to startup, for example during a startup testing sequence. In another embodiment, the fault detection module 302 signals the controller 116 or other device of the fault condition. For example, the fault detection module 302 may send a signal on a communication line 334 to the controller 116 or to another device so that a user is alerted to the fault condition. The fault detection module 302 may also include an identifier of the motor 108 affected by the fault condition so that the user may focus repair efforts on the motor 108 affected by the fault condition.

In one embodiment, the fault detection module 302 determines that a fault condition exists in the dynamic braking apparatus 102 by determining if one or more of the detectors are experience an unexpected condition. For example, if one or both of the first and second current sensors 310, 320 experience a higher than expected current level, the fault detection module 302 may signal a fault condition Likewise, if one or both of the first and second voltage sense connections 314, 324 experience a higher or lower than expected voltage level, the fault detection module 302 may signal a fault condition.

In one embodiment, the apparatus 300 includes a start sequence module 304 that applies a startup testing sequence, during a startup sequence, to determine a fault condition for the dynamic braking apparatus 102, for example for the dynamic braking resistor 104, the first switch 202, the second switch 204, and/or one or more detectors associated with the first and second switches 202, 204 and dynamic braking resistor 104. The startup sequence, for example may be for the motor controller 106. In another example, the startup sequence is a startup sequence for the dynamic braking apparatus 102. In other examples, the startup sequence is associated with starting up a system, a production line, an assembly line, etc.

In one embodiment, the startup sequence occurs before the motor controller 106 gives a command to connect the dynamic braking resistor 104. This may be before startup of the motor 108, during startup of the motor controller 106, while the motor controller 106 and motor 108 are running but before any dynamic braking is anticipated, etc. The startup sequence, in one embodiment, occurs during a time when opening and closing the first and second switches 202, 204 may occur without affecting motor operation. One of skill in the art will recognize other situations where a startup sequence may occur.

The start sequence module 304 applies the startup testing sequence to determine if any fault conditions exist in the dynamic braking apparatus 102. Typically the fault conditions may occur in a power pathway from the first power bus 328 to the second power bus 330 and associated sensors (e.g. 310, 314, 320, 324) and controls (e.g. 316, 326). The start sequence module 304 may apply the startup testing sequence by sensing current in the first and second current sensors 310, 320 and by sensing voltage at the first and second connections 308, 318 to the dynamic braking resistor 104 during various conditions. For example, the start sequence module 304 may sequence opening and closing the first switch 202 and the second switch 204 in a particular sequence while checking for abnormal voltages and currents.

In one embodiment, the start sequence module 304 applies the startup testing sequence while the first and second power busses 328, 330 are energized. In another embodiment, the start sequence module 304 applies the startup testing sequence while another voltage source applies power. For example, the dynamic braking apparatus 102 may include a power supply and the start sequence module 304 may apply voltage from the power supply to identify fault conditions. The power supply may supply a lower voltage than the first and second power busses 328, 330, which may reduce a risk of equipment damage due to a fault condition compared to testing with the first and second power busses 328, 330 energized. In another embodiment, the start sequence module 304 partially energizes the first and second power busses 328, 330 for the startup testing sequence. One of skill in the art will recognize other ways to energize the dynamic braking apparatus 102 during a startup testing sequence.

In one embodiment, the apparatus 300 includes a running sequence module 306 that applies a running testing sequence, while the motor controller 106 is controlling the motor 108, to determine a fault condition for the dynamic braking apparatus 102. For example, the running sequence module 306 may determine a fault condition for the dynamic braking resistor 104, the first switch 202, the second switch 204, and one or more detectors associated with the first and second switches 202, 204, and the dynamic braking resistor 104.

The running sequence module 306 typically applies the running testing sequence while the motor 108 is running. In another embodiment, the running sequence module 306 typically applies the running testing sequence while the motor controller 106 is controlling the motor 108 to run, stop, provide torque, or other running condition known to those in the art. In one embodiment, the switch control module 206 maintains one of the first and second switches 202, 204 in a closed position while the motor controller 106 is controlling the motor 108. For instance, the switch control module 206 may close the first switch 202 while maintaining the second switch 204 remains open. The switch control module 206 may then close the second switch 204 in response to a command from the motor controller 106 to connect the dynamic braking resistor 104.

With one switch (e.g. 202) closed, the running sequence module 306 may have fewer options for a running testing sequence than the startup testing sequence. The running sequence module 306 may check currents in first and second switches 202, 204, voltage at the first and second connections 308, 318, etc. while the first switch 202 remains closed and while opening and closing the second switch 204. The running sequence module 306 may momentarily close first switch 202 and/or second switch 204 to avoid significant effects in motor 108 operation. The running testing sequence may involve higher voltages than the startup testing sequence and may involve a different set of expected voltages and currents than testing during startup. In another embodiment, both the first switch 202 and the second switch 204 are available for testing during a running testing sequence. In another embodiment, the running sequence module 306 suspends testing when the motor controller 106 sends a signal to connect the dynamic braking resistor 104. In one example, the running sequence module 306 starts the running testing sequence from the beginning of the running testing sequence once the motor controller 106 no longer requires connection of the dynamic braking resistor 104. In another embodiment, the running sequence module 306 resumes the running testing sequence from a point prior to when the motor controller 106 sent a signal to connect the dynamic braking resistor 104. One of skill in the art will recognize other ways for the dynamic braking apparatus 102 to be used during startup or while running to detect a fault condition.

In one embodiment, the apparatus 300 includes a thermal model module 307 that models heat associated with the dynamic braking resistor 104. For example, the thermal model module 307 may model heat of the restive element of the dynamic braking resistor 104. The thermal model module 307 may also model heat transfer to a case of the dynamic braking resistor. For example, the resistive element of the dynamic braking resistor 104 may include sand or another substance that transmits heat from the resistive element to the case of the dynamic braking resistor 104. In another embodiment, the thermal model module 307 may model heat transferred from the dynamic braking resistor 104 to an environment surrounding the dynamic braking resistor 104, such as air surrounding the dynamic braking resistor 104. The thermal model module 307 may model other heat-related aspects of the dynamic braking resistor 104 as well. The fault detection module 302 may then detect a fault condition when heat calculated by the thermal model module 307 exceeds one or more heat limits.

In one embodiment, the thermal model module 307 includes models of resistors and capacitors for modeling heat in the dynamic braking resistor 104. The models may be simulated in a microprocessor or other computing device of the dynamic braking apparatus 102. For example, a model resistor and a model capacitor pair may represent heat of the resistive element of the dynamic braking resistor 104. Current to the model resistor may be proportional to current in the dynamic braking resistor 104 and the model resistor may be modeled as connecting to the model capacitor such that voltage across the model capacitor may represent heat buildup in the resistive element of the dynamic braking resistor 104. Another model of a bleed resistor connected to the model capacitor may represent cooling when current in the dynamic braking resistor 104 is reduced or is zero. Additional resistor and capacitor models may be cascaded to represent heat transfer from the resistive element to the case of the dynamic braking resistor 104 and from the case to the environment around the dynamic braking resistor 104. The bleed resistor model may be connected to the last capacitor in the model to represent cooling. One of skill in the art will recognize other ways to model heat in the dynamic braking resistor 104.

The thermal model module 307 may include one or more thermal limits. For example, the thermal model module 307 may include a heat limit that corresponds to heat of the resistive element of the dynamic braking resistor 104 so that when voltage across the capacitor associated with the resistive element reaches the heat limit, the thermal model module 307 may then signal a fault condition to the fault detection module 302. Other limits may be associated with other capacitors modeling heat in the dynamic braking resistor 104.

In one embodiment, the thermal model module 307 includes a power retention mechanism to retain heat information when power is lost to other elements in the apparatus 300 or system 100. For example, the power retention mechanism may include a real-time clock with a battery backup. When power is restored, the thermal model module 307 may determine a time for the power outage and may recreate heating or cooling at various points in time. The thermal model module 307 may then continue in real time after the heat information is recreated for the power outage. This may be advantageous so that heat information of dynamic braking resistor 104 is not lost for conditions where power is lost and the dynamic braking resistor 104 has not cooled to an ambient condition.

In another embodiment, the thermal model module 307 includes physical resistors and capacitors. The thermal model module 307 may include a clock, a power source, etc. with a battery backup and may continue operating during a power outage. The thermal model module 307 may include a memory mechanism, such as a register to store information from the thermal model module 307, such as voltage levels at a particular point in time. One of skill in the art will recognize other ways to implement a thermal model module 307 with real or simulated components that model heat in the dynamic braking resistor 104 and that signals a fault condition upon reaching a heat limit.

Figure 4:
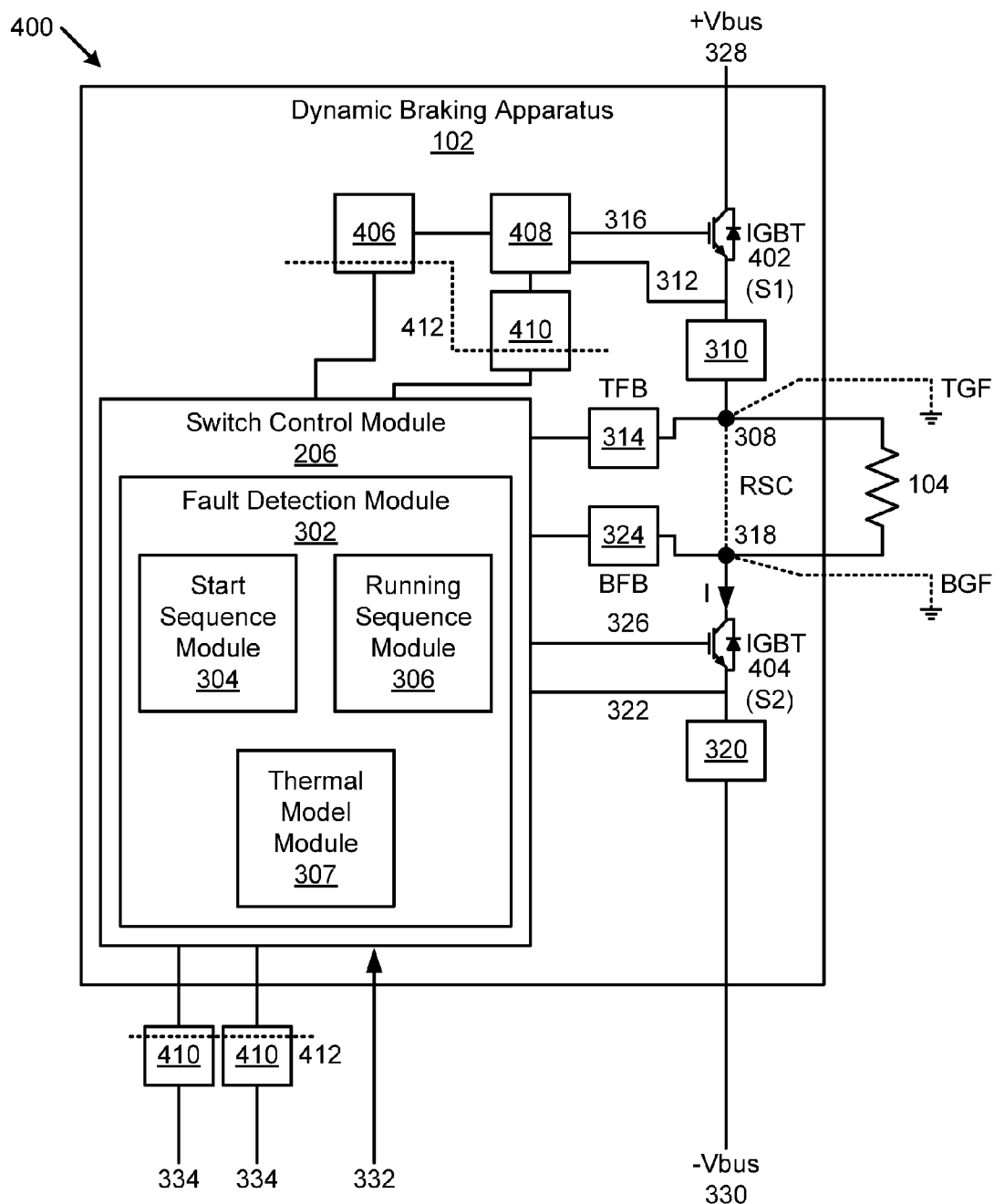
FIG. 4 is a schematic block diagram illustrating a more detailed embodiment of an apparatus for dynamic braking.

FIG. 4 is a schematic block diagram illustrating a more detailed embodiment of an apparatus 400 for dynamic braking. The apparatus 400 is a particular embodiment of a dynamic braking apparatus 102 and includes a switch control module 206 with a fault detection module 302, a start sequence module 304, a running sequence module 306, a thermal model module 307, a first connection 308, a first current sensor 310, a first current sensor connection 312 a first voltage sense connection 314, a first switch control line 316, a second connection 318, a second current sensor 320, a second current sensor connection 322 a second voltage sense connection 324, a second switch control line 326, a first power bus 328, a second power bus 330, a dynamic braking command line 332, and one or more communication lines 334, which are substantially similar to those described above in relation to the system 100 and apparatuses 200, 300 of FIGS. 1-3. The apparatus 400 also includes a first IGBT switch 402, a second IGBT switch 404, a top power supply 406, a first switch controller 408, optocouplers 410, and voltage isolation 412, which are described below.

In one embodiment, the apparatus 400 includes a first switch 202 that is a first insulated-gate bipolar transistor ("IGBT") switch 402 and a second switch 204 that is a second IGBT switch 404. In one embodiment, the first and second IGBT switches 402, 404 function substantially the same as described in the system 100 and apparatuses 200, 300 of FIGS. 1-3. IGBTs typically have a characteristic of a body diode so that current is controlled in one direction but may flow in the opposite direction uncontrolled by a control line (e.g. 316, 326) when voltage conditions drive current in the opposite direction. For example, where voltage measured from first power bus 328 to the second power bus 330 is a positive DC voltage, current is typically controlled flowing from the first power bus 328 to the second power bus 330. If a fault causes voltage to be reversed across one of the IGBT switches 402, 404, current may flow in the body diode of the IGBT switches 402, 404.

In one embodiment, the apparatus 400 may include voltage references for various elements that are different so that the first and second IGBT switches 402, 404 operate as intended. For example, the switch control module 206 may include a microprocessor, power supply, drivers, etc. referenced to the second power bus 330. The apparatus 400 may include a top power supply 406 referenced such to enable operation of the first IGBT switch 402. The top power supply 406 may provide power to a first switch controller 408 that is controlled by the switch control module 206 through an optocoupler 410 to provide voltage isolation 412 from the reference of the switch control module 206. The top power supply 406 may also have voltage isolation 412 from the voltage reference of the switch control module 206. In addition the communication lines 334 may also be voltage isolated 412 from the switch control module 206 with optocouplers 410. The dynamic braking command line 332 may be referenced the same as the motor controller 106 or may be isolated and another optocoupler 410 may be used (not shown). Other embodiments of a dynamic braking apparatus 102 may include other topologies, may have first and second switches 202, 204 of a different type, may have other voltage references, etc. One of skill in the art will recognize other suitable topologies of a dynamic braking apparatus 102 with two switches 202, 204.

Note that various labels are included in FIG. 4, which correspond to the testing sequences shown in FIGS. 8 and 9. For example, the first IGBT switch 402 is labeled S1, the second IGBT switch 404 is labeled S2, the first voltage sense connection 314 is labeled TFB (i.e. top feedback), the second voltage sense connection 324 is labeled BFB (i.e. bottom feedback), and the current through the second IGBT switch 404 is labeled "I." In addition, three fault conditions are shown. A resistor short circuit ("RSC") is shown across the dynamic braking resistor 104. The RSC fault could be, for example, a short across the first and second connections 308, 318, a shorted dynamic braking resistor 104, etc. A top ground fault ("TGF") condition is shown where there is a fault at the first connection 308, but may also be somewhere between the first IGBT switch 402 and the top end of the dynamic braking resistor 104. A bottom ground fault ("BGF") condition is shown where there is a fault at the second connection 318, but may also be somewhere between the second IGBT switch 404 and the bottom end of the dynamic braking resistor 104. In addition, other fault conditions may exist, such as a shorted first or second IGBT switch 402, 404, a damaged first or second current sensor 310, 320, a malfunctioning first or second IGBT switch 402, 404, a damaged first or second voltage sense connection 314, 324, an open dynamic braking resistor 104, etc. Various fault conditions will be discussed in regard to the testing sequences of FIGS. 8 and 9.

Figure 5:
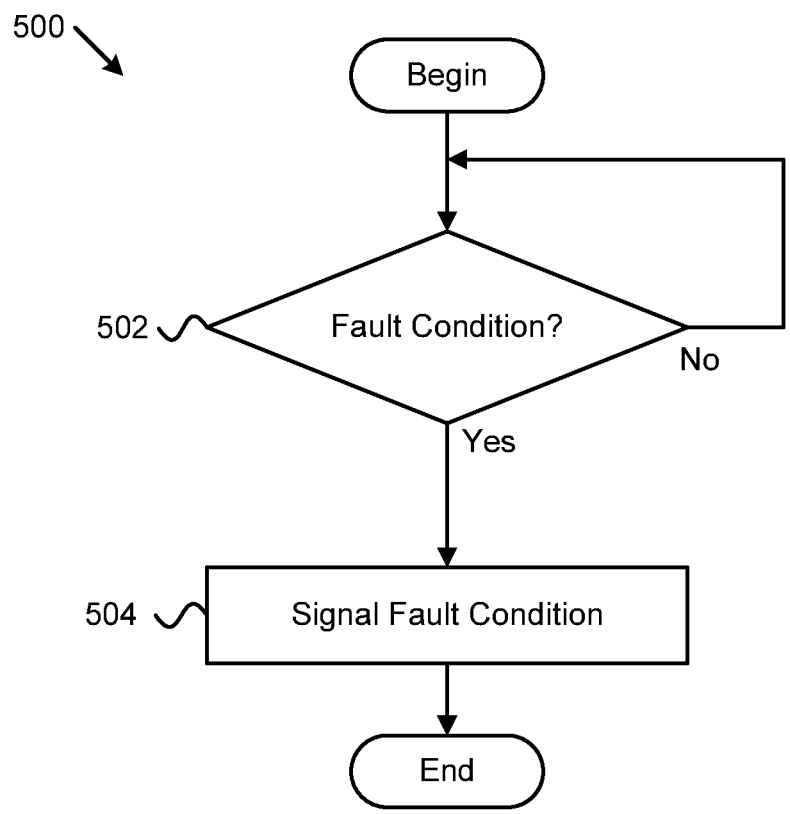
FIG. 5 is a schematic flow chart diagram illustrating one embodiment of a method for dynamic braking.

FIG. 5 is a schematic flow chart diagram illustrating one embodiment of a method 500 for dynamic braking. The method 500 begins and determines 502 if a fault condition exists in the dynamic braking apparatus 102. In the embodiment, the dynamic braking apparatus 102 includes a dynamic braking resistor 104, a first switch 202 that connects a first connection 308 of the dynamic braking resistor 104 to a first power bus 328, and a second switch 204 that connects a second connection 318 of the dynamic braking resistor 104 to a second power bus 330. In one embodiment, the dynamic braking apparatus 102 includes a first current sensor 310 that senses current in the first switch 202, a second current sensor 320 that senses current in the second switch 204, a first voltage sense connection 314 that senses voltage associated with the first connection 308, and/or a second voltage sense connection 324 that senses voltage associated with the second connection 318.

If the method 500 determines 502 that a fault condition does not exist on the dynamic braking apparatus 102, the method 500 returns and again determines 502 if a fault condition exists in the dynamic braking apparatus 102. If the method 500 determines 502 that a fault condition exists on the dynamic braking apparatus 102, the method 500 signals 504 a fault condition, and the method 500 ends. In one embodiment, the fault detection module 302 determines 502 if a fault condition exists in the dynamic braking apparatus 102 and signals 504 a fault condition. For example the switch control module 206 may open one or more of the first and second switches 202, 204 in response to the fault signal.

Figure 6:
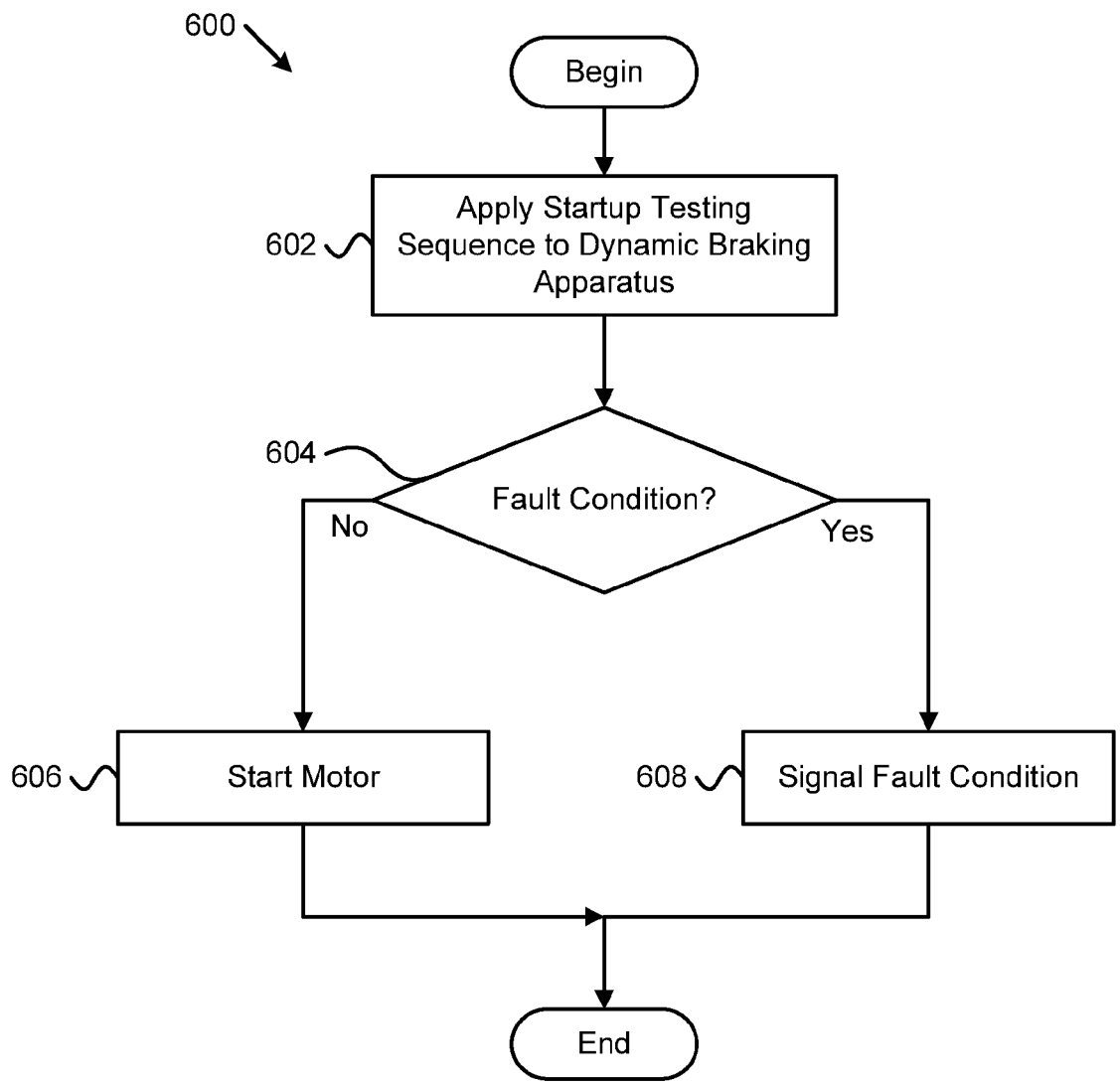
FIG. 6 is a schematic flow chart diagram illustrating one embodiment of a method for dynamic braking testing prior to startup of a motor.

FIG. 6 is a schematic flow chart diagram illustrating one embodiment of a method 600 for dynamic braking testing prior to startup of a motor 108. The method 600 begins and applies 602 a startup testing sequence to the dynamic braking apparatus 102. For example, the start sequence module 304 may apply 602 the startup testing sequence. The dynamic braking apparatus 102 is part of a system 100 that controls a motor 108 with a motor controller 106 where the dynamic braking apparatus 102 operates to connect a dynamic braking resistor 104 to the motor controller 106 for dynamic braking.

The method then determines 604 if a fault condition exists in the dynamic braking apparatus 102, including the dynamic braking resistor 104. If the method 600 determines 604 that a fault condition does not exist in the dynamic braking apparatus 102, the method 600 starts 606 the motor 108, and the method 600 ends. For example, the dynamic braking apparatus 102 may send a signal to the motor controller 106 that the startup testing sequence is complete and did not find a fault condition and the motor controller 106 then starts 606 the motor 108. If the method 600 determines 604 that a fault condition exists in the dynamic braking apparatus 102, the method 600 signals 608 a fault condition and the method 600 ends. In one example, the start sequence module 304 may determine 604 if a fault condition exists and may signal 608 a fault condition, or alternatively signal no fault so the motor controller 106 can start the motor 108.

Figure 7:
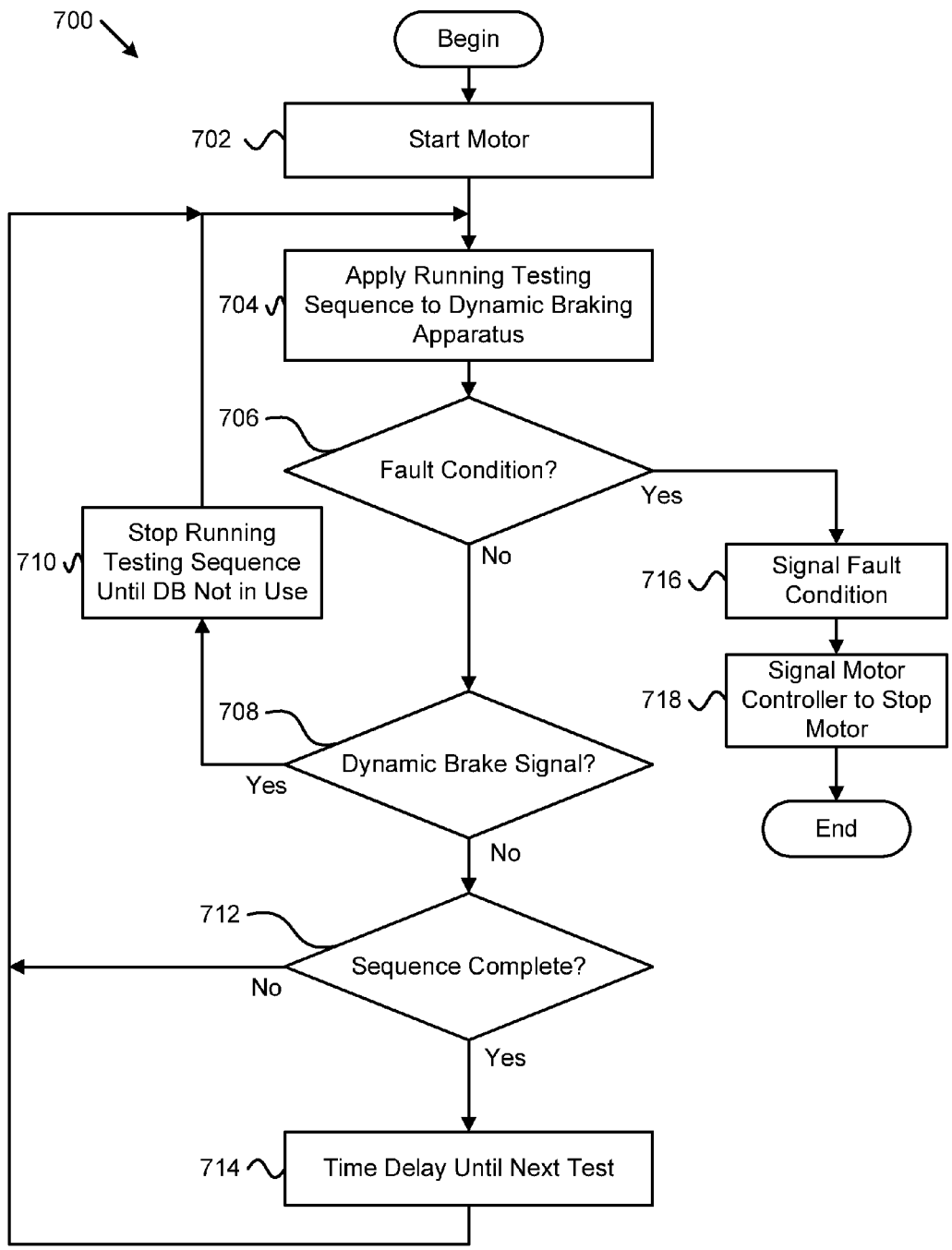
FIG. 7 is a schematic flow chart diagram illustrating one embodiment of a method for dynamic braking testing while a motor is running.

FIG. 7 is a schematic flow chart diagram illustrating one embodiment of a method 700 for dynamic braking testing while a motor 108 is running. The method 700, for example, may apply to an apparatus similar to the apparatuses 300, 400 of FIGS. 3 and 4. The method 700 begins and starts 702 the motor 108, for example with the motor controller 106. The method 700 applies 704 a running testing sequence to the dynamic braking apparatus 102. For example, the running sequence module 306 may apply 704 the running testing sequence. The method 700 determines 706 if a fault condition exists in the dynamic braking apparatus 102. If the method 700 determines 706 that a fault condition does not exist in the dynamic braking apparatus 102, the method 700 determines 708 if there is a dynamic brake signal. For example, the motor controller 106 may send the dynamic brake signal in a dynamic braking situation.

If the method 700 determines 708 that there is a dynamic brake signal, the method 700 stops 710 the running testing sequence until dynamic braking is not in use. The method 700 and returns and applies 704 the running testing sequence. If the method 700 determines 708 that there is not a dynamic brake signal, the method 700 determines 712 if the running testing sequence is complete. If the method 700 determines 712 that the running testing sequence is not complete, the method 700 returns and applies 704 the running testing sequence. If the method 700 determines 712 that the running testing sequence is complete, the method 700 waits 714 a time delay until a next testing sequence and then returns and applies 704 the running testing sequence again.

If the method 700 determines 706 that a fault condition exists in the dynamic braking apparatus 102, the method 700 signals 716 a fault condition and signals 718 the motor controller 106 to stop the motor 108, and the method 700 ends. In one embodiment, the running sequence module 306 determines 712 if the running testing sequence is complete, stops 710 the running testing sequence when a dynamic brake signal is present, and applies 704 the running testing sequence after dynamic braking. In one embodiment, the method 700 applies 704 the running testing sequence from the beginning after dynamic braking. In another embodiment, the method 700 applies 704 running testing sequence from a point where the running testing sequence was interrupted due to dynamic braking. One of skill in the art will recognize other ways to apply a running testing sequence while a motor 108 is running and how to interrupt the running testing sequence for dynamic braking.

FIG. 8 is a running testing sequence 800 for dynamic braking testing while a motor 108 is running. The running testing sequence 800 may be applied by the running sequence module 306. The first column of the running testing sequence 800 indicates a test number. The S1 column indicates a condition of the first switch 202. In the running testing sequence 800, the first switch 202 is closed. This is typical of an operating scenario where the first switch 202 remains closed during motor 108 operation and the second switch 204 opens and closes to start and stop dynamic braking. Other running testing sequences may have both the first and the second switches 202, 204 open during motor 108 operation, or may have the second switch 204 closed during motor 108 operation.

Tests 1-15 are part of a first test group and indicate a test condition where the control variable of the first switch 202 (indicated by S1) is closed and the second control variable of the second switch 204 (indicated by S2) is open. The control variables TFB, BFB and I of the next three columns indicate sensor input from the first voltage sense connection 314, the second voltage sense connection 324, and current through the second current sensor 320 respectively. The next nine columns under the heading "Faults" are various faults and conditions that may be present in the dynamic braking apparatus 102. GF stands for ground fault, SC stands for short circuit, Op stands for open, high represents a high-voltage condition when a lower voltage condition is expected, and low represents a low-voltage condition when a higher voltage condition is expected. TGF, RSC, and BGF are discussed above in relation to the apparatus 400 of FIG. 4. RO there presents "resistor open," and corresponds to a condition where the dynamic braking resistor 104 is open or disconnected. The S1 and S2 columns correspond to conditions with respect to the first switch 202 and the second switch 204. The TFB and BFB columns represent problems associated with the first voltage sense connection 314 and the second voltage sense connection 324. The I column indicates a condition where current is as expected, too high or too low.

The result column indicates a condition of a normal operating condition, a fault condition, or a fault not detected condition. The step column indicates either a next test step or a condition where the running testing sequence is completed. The diagnostic column indicates a problem that may exist in the dynamic braking apparatus 102 based on the condition of the control variables.

Tests 16-20 are part of a second group of tests that are applied where the step column in the first 15 tests indicates a 16. Tests 21-22 are part of a third group of tests that are applied where the step column in the first 15 tests indicates a 21. Once the running testing sequence 800 is completed and no fault conditions are found, the running sequence module 306 may wait a period of time and then reapply the running testing sequence 800. Where the running sequence module 306 determines that a fault condition exists, the running sequence module 306 may signal a fault condition and motor controller 106 take steps to stop for motor 108.

For example for test 1, where the first switch 202 is closed, the second switch 204 is open, TFB is 1, BFB is a 1, and I is zero, this condition may correspond with no fault condition existing in the dynamic braking apparatus 102. However, test 1 requires applying the second group of tests (indicated by a 16 in the step column). The running sequence module 304 closes the second switch 204 for the second test group. For test 16, in this condition, TFB is 1, BFB is 0, and I is 0. This condition indicates normal operating condition for the dynamic braking apparatus 102, which may result in continued operation of the motor 108. Where TFB is 1, this may indicate that the first switch 202 is closed and functioning so that the first power bus 328 voltage is present at the first connection 308. Where BFB is 1, this may indicate that the first switch 202 is closed and functioning, thus connecting the dynamic braking resistor 104 so that the first power bus 328 voltage is present at the second connection 318. Since the second switch 204 is open and operating correctly, current through the second switch 204 is zero. When the second switch 204 is closed for the second test group, in test 16 voltage at the second connection 318 becomes about the same as the voltage of the second power bus 330, thus BFB becomes a 0. In addition, current flows through the dynamic braking resistor 104 and through the second switch 204, so I is a 1. Thus where the conditions exist in test 1 and test 16, the dynamic braking apparatus 102 may be deemed to be operating normally without a fault condition.

Note that for test 2, a top ground fault ("TGF") condition may exist where S1, S2, TFB, BFB, and I are the same as for test 1. In this condition, the first current sensor 310 may indicate current is flowing through the first switch 202 so the top ground fault is detected. Where the conditions of test 2 exist and current is flowing in the first switch 202, the running sequence module 304 may indicate a top ground fault. For test 3, again S1, S2, TFB, BFB, and I are the same as for test 1, but test 3 corresponds to a short circuit condition for the dynamic braking resistor 104. Again test 3 indicates moving to test 16 in the step column so that the running sequence module 304 starts the second group testing. The short circuit condition of the dynamic braking resistor 104 is diagnosed in test 17 where the first and second switches 202, 204 closed, TFB is 1, BFB is 0, and current is flowing through the second switch 204, but is higher than expected. The running sequence module 304 may then signal a fault where the dynamic braking resistor 104 is shorted, or a similar condition exists, such as a short from the first connection 308 to the second connection 318.

Test 4 corresponds to a bottom ground fault condition and indicates that the first switch 202 is closed, the second switch 204 is open, TFB is 1, BFB is 0.5, and I is 0. The 0.5 condition for BFB indicates a voltage at the second connection 318 that may be about half what is expected, or at least a lower value than expected. For test 4, the bottom ground fault condition is detected by determining the voltage condition at the second connection 318. Other control variable conditions are shown in the running testing sequence 800 of FIG. 8 and can be analyzed in a similar manner as tests 1-4. The running testing sequence 800 of FIG. 8 is one possible running testing sequence. One of skill in the art will recognize other running testing sequences.

FIG. 9 is a startup testing sequence 900 for dynamic braking prior to startup of a motor 108. The startup testing sequence 900 includes columns for test number, control variables, faults, results, step, and diagnostic which are similar to the columns of the running testing sequence 800 of FIG. 8. Tests 1-15 correspond to a first group of tests where the first switch 202 and the second switch 204 are open. Tests 16-25 correspond to a second group of tests where the first switch 202 is closed and the second switch 204 is open. Tests 26-29 correspond to a third group of tests and tests 30-31 correspond to a fourth group of tests where, for the third and fourth groups of tests, the first switch 202 and the second switch 204 are closed. Tests 32-34 correspond to a fifth group of tests for various conditions of the first and second switches 202, 204.

The start sequence module 304, in one embodiment, applies the startup testing sequence 900 and signals a fault condition when detected. Typically the start sequence module 304 applies the start of testing sequence 900 during a startup condition. The methodology explained above with respect to the running testing sequence 800 of FIG. 8 for determining various fault conditions may also be applied to the startup testing sequence 900 of FIG. 9. The startup testing sequence 900 of FIG. 9 is merely one startup testing sequence and one of skill in the art will recognize other startup testing sequences. One of skill in the art will recognize how to use the startup testing sequence 900 along with the apparatuses 200, 300, 400 of FIGS. 2-4.

The described examples and embodiments are to be considered in all respects only as illustrative and not restrictive. This written description uses examples and embodiments to disclose the invention, including best mode, and also to enable any person skilled in the art to practice the invention, including making and using any devices or systems and performing any incorporated methods. The examples and embodiments may be practiced in other specific forms. The patentable scope of this invention is defined by the claims and may include other examples that occur to those skilled in the art. Such other examples are intended to be within the claims if they have structural elements that do not differ from the literal language of the claims, or if they include equivalent structural element with insubstantial differences from the literal languages of the claims.

What is claimed is:

1. An apparatus comprising:
    a first switch connected to a first connection of a dynamic braking resistor and to a first power bus of a motor controller;
    a second switch connected to a second connection of the dynamic braking resistor and to a second power bus of the motor controller, the motor controller providing power to and controlling a motor;
    a switch control module that controls the first and second switches to connect the dynamic braking resistor to the first and second power buses, the switch control module controlling the first and second switches in response to a signal from the motor controller; and
    a fault detection module that signals a fault condition in response to detecting a fault condition associated with one or more of the dynamic braking resistor, the first switch, the second switch, and one or more detectors associated with the first and second switches and dynamic braking resistor, wherein the one or more detectors comprise one or more of a first current sensor that senses current through the first switch, a first voltage sense connection at the first connection to the dynamic braking resistor, a second current sensor that senses current through the second switch, and a second voltage sense connection at the second connection to the dynamic braking resistor.

2. The apparatus of claim 1, wherein the switch control module opens one or more of the first switch and the second switch in response to the fault detection module signaling the fault condition.

3. The apparatus of claim 1, wherein the motor controller comprises a first motor controller and wherein power to the first motor controller is controlled by a contactor, wherein the contactor controls power to two or more motor controllers including the first motor controller, and wherein the fault module further sends a stop signal to the first motor controller in response to detecting the fault condition.

4. The apparatus of claim 3, wherein the contactor maintains power to the two or more motor controllers while the first motor controller stops power to the motor in response to the stop signal.

5. The apparatus of claim 1, wherein the fault detection module detects the fault condition by determining if one or more of:
    a current through the first switch is an unexpected current;
    a current through the second switch is an unexpected current;
    a voltage at the first connection is an unexpected voltage; and
    a voltage as the second connection is an unexpected voltage.

6. The apparatus of claim 5, further comprising a thermal model module that models one or more of heat of a resistive element of the dynamic braking resistor, heat transfer to a case of the dynamic braking resistor, and heat transferred from the dynamic braking resistor to an environment surrounding the dynamic braking resistor, wherein the fault detection module detects a fault condition when heat calculated by the thermal model module exceeds one or more heat limits.

7. The apparatus of claim 1, wherein one or more of the first current sensor and the second current sensor comprise a resistor and wherein the fault detection module uses voltage across the resistor to determine current.

8. The apparatus of claim 1, wherein the fault detection module further comprises a start sequence module that applies a startup testing sequence, during a startup sequence, to determine a fault condition for the apparatus.

9. The apparatus of claim 8, wherein the startup testing sequence comprises closing and opening the first switch and the second switch in a sequence to detect one or more of a ground fault, a shorted dynamic braking resistor, an open dynamic braking resistor, the first switch failed short, the second switch failed short, a failed current sensor, and a failed voltage sense connection.

10. The apparatus of claim 8, wherein the startup sequence comprises one or more of a startup sequence of the motor controller and a startup sequence of the apparatus.

11. The apparatus of claim 1, wherein the fault detection module further comprises a running sequence module that applies a running testing sequence, while the motor controller is controlling the motor, to determine a fault condition for the apparatus.

12. The apparatus of claim 11, wherein the running testing sequence comprises closing and opening one or more of the first switch and the second switch in a sequence to detect one or more of a ground fault, a shorted dynamic braking resistor, an open dynamic braking resistor, the first switch failed short, the second switch failed short, a failed current sensor, and a failed voltage sense connection.

13. The apparatus of claim 1, wherein the dynamic braking resistor is a resistor without a thermal switch that opens in response to a temperature of the resistor reaching a threshold.

14. A method comprising:
determining that a fault condition exists in a dynamic braking apparatus, the dynamic braking apparatus comprising a dynamic braking resistor, a first switch, a second switch, a first current sensor that senses current in the first switch, a second current sensor that senses current in the second switch, a first voltage sense connection that senses voltage associated with a first connection, and a second voltage sense connection that senses voltage associated with a second connection, wherein the first switch connects the dynamic braking resistor to a first power bus of a motor controller via the first connection, and the second switch connects the dynamic braking resistor to a second power bus of the motor controller via the second connection, the motor controller controlling a motor; and
opening one or more of the first switch and the second switch in response to determining that the fault condition exists in the dynamic braking circuit.

15. The method of claim 14, wherein determining that the fault condition exists further comprises determining that an unexpected value is returned by one or more of the first current sensor, the second current sensor, the first voltage sensor, and the second voltage sensor.

16. The method of claim 14, wherein determining that the fault condition exists further comprises applying a startup test sequence during a startup condition, the startup test sequence comprising closing and opening the first switch and the second switch in a sequence to detect the fault condition, the fault condition comprising one or more of a ground fault, a shorted dynamic braking resistor, an open dynamic braking resistor, the first switch failed short, the second switch failed short, a failed current sensor, and a failed voltage sense connection.

17. The method of claim 14, wherein determining that the fault condition exists further comprises applying a running test sequence while the motor controller controls the motor, the running test sequence comprising closing and opening one or more of the first switch and the second switch in a sequence to detect the fault condition, the fault condition comprising one or more of a ground fault, a shorted dynamic braking resistor, an open dynamic braking resistor, the first switch failed short, the second switch failed short, a failed current sensor, and a failed voltage sense connection.

18. A system comprising:
a motor controller that controls a motor;
a dynamic braking resistor;
a first switch connected to the dynamic braking resistor at a first connection point and to a first power bus of the motor controller, the first switch connecting the dynamic braking resistor to the first power bus;
a second switch connected to the dynamic braking resistor at a second connection point and to a second power bus of the motor controller, the second switch connecting the dynamic braking resistor to the second power bus;
a first current sensor that senses current through the first switch;
a first voltage sense connection at the first connection to the dynamic braking resistor;
a second current sensor that senses current through the second switch;
a second voltage sense connection at the second connection to the dynamic braking resistor
a switch control module that controls the first and second switches to connect the dynamic braking resistor to the first and second power buses, the switch control module controlling the switches in response to a signal from the motor controller; and
a fault detection module that signals a fault condition in response to detecting a fault condition associated with one or more of the dynamic braking resistor, the first switch, the second switch, and one or more detectors associated with the first and second switches and dynamic braking resistor, wherein the one or more detectors comprise one or more of the first current sensor, the first voltage sense connection, the second current sensor, and the second voltage sense connection.

19. The system of claim 18, wherein the fault detection module opens at least one of the first and second switches in response to detecting a fault condition associated with one or more of the dynamic braking resistor, the first switch, the second switch, and one or more detectors associated with the first and second switches.

* * * * *